July 6, 1937.  T. TOGNOLA  2,086,398
MAGNETO ROTOR
Filed April 18, 1936  2 Sheets-Sheet 1

Witness:
Burr W. Jones

INVENTOR.
Tullio Tognola
BY Clinton S. James
ATTORNEY.

July 6, 1937.　　　　T. TOGNOLA　　　　2,086,398
MAGNETO ROTOR
Filed April 18, 1936　　2 Sheets-Sheet 2

Witness:
Burr W. Jones

INVENTOR.
BY Tullio Tognola
Clinton S. Janes.
ATTORNEY.

Patented July 6, 1937

2,086,398

UNITED STATES PATENT OFFICE 2,086,398

MAGNETO ROTOR

Tullio Tognola, Sidney, N. Y., assignor to Bendix Aviation Corporation, South Bend, Ind., a corporation of Delaware Application April 18, 1936, Serial No. 75,249

5 Claims. (Cl. 171—209)

The present invention relates to magneto rotors and more particularly to rotors of composite construction having predetermined characteristics as to output and dimensions.

The various known magnet steels have well defined characteristics which make each of them preferable for certain designs of magneto. Thus, cobalt steel has a comparatively high coercive force but is not as permeable as chrome magnet steel, whereas chrome magnet steel is comparatively low as to coercive force but is more permeable and much cheaper than cobalt magnet steel.

It follows from the above that a rotor designed for a magneto of certain output capacity would have comparatively short magnets of large cross-section if cobalt magnet steel were used, while the magnets would be considerably longer with smaller cross-section if chrome steel were used. However, if a rotor were desired having the same output characteristics but of intermediate dimensions, there would be difficulty in securing an efficient design incorporating solely either type of magnet steel, and while special steels might be developed having characteristics more or less intermediate those of the components, such special alloys would be disproportionately expensive and would entail other disadvantages with respect to special preparation and handling.

It is an object of the present invention to provide a novel form of magneto rotor which is flexible in design to permit variations in output characteristics while maintaining overall efficiency.

It is another object to provide a novel magneto rotor having output characteristics which may be predetermined through a considerable range while maintaining the dimensions of the rotor.

A further object is to provide such a rotor which is a composite of a plurality of magnet steels of differing characteristics.

It is another object to provide such a rotor, the output characteristics of which are the resultant of those of the component magnet steels.

Further objects and advantages will be apparent from the following description taken in connection with the accompanying drawings in which.

Figure 1:
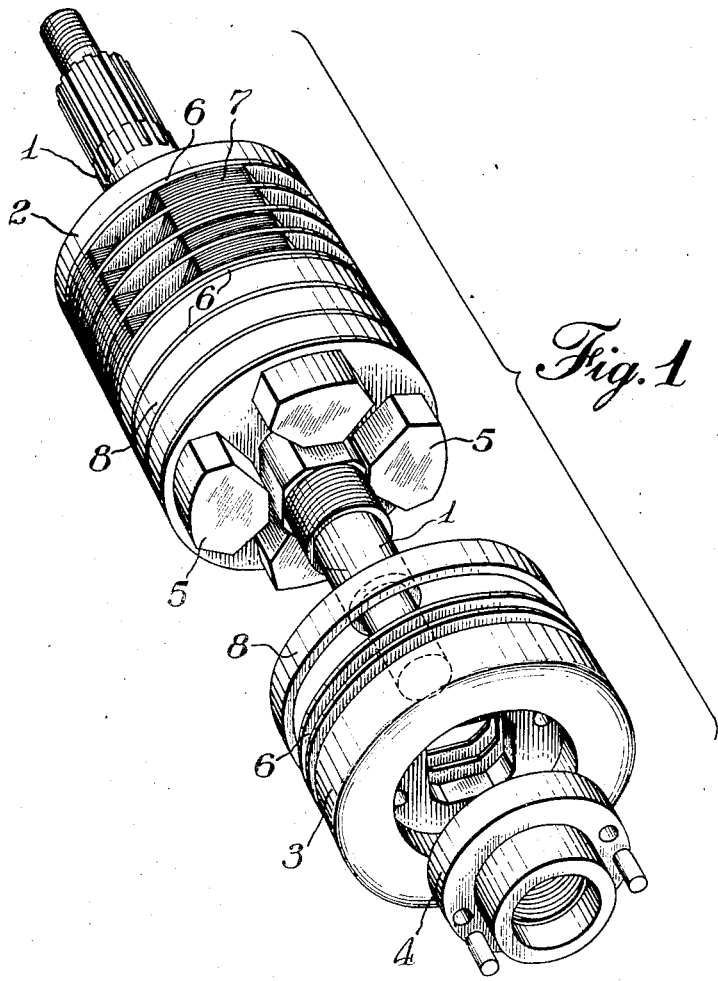
Fig. 1 is a perspective view of a rotor constituting a preferred embodiment of the invention, the parts of the rotor being partially disassembled in order to show the interior construction.

Referring first to Fig. 1 of the drawings, there is illustrated a commercial form of magneto rotor comprising shaft 1 on which is non-rotatably mounted a non-magnetic end plate 2 and having an end plate 3 adapted to be non-rotatably mounted thereon and clamped by suitable means such as a nut 4.

A plurality of bar magnets 5 are clamped between the heads 2 and 3 in parallel relationship with unlike poles arranged in sequence circumferentially and are retained against the effect of centrifugal force by suitable means such as non-magnetic discs 6. The ends of the magnet bars adjacent the non-magnetic end plate 2 are preferably enclosed in laminated magnetic pole pieces 7, and the discs 6 adjacent the other end of the rotor are spaced by suitable non-magnetic rings 8.

Rotors of this character are manufactured commercially to standard dimensions using commercial magnet steels of known characteristics, but if rotors of somewhat different characteristics are required, it has been necessary to redesign the rotor and consequently redesign the entire magneto for this purpose, thus necessitating considerable expense.

Figure 2:
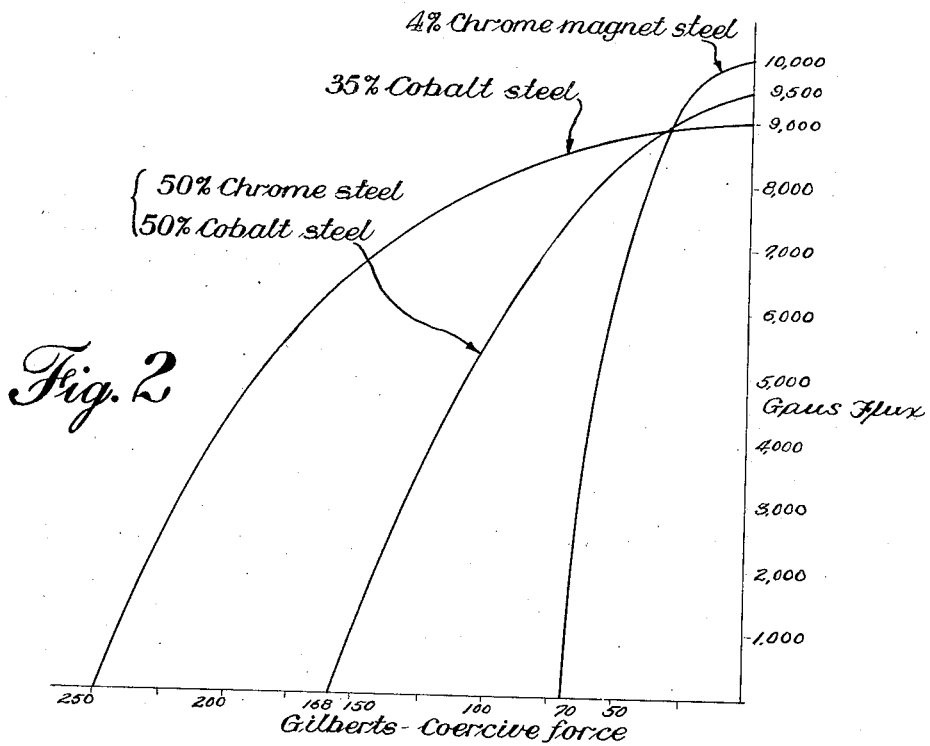
Fig. 2 is a graphical representation of the relationship of flux to coercive force in various magnet steels.
Figure 3:
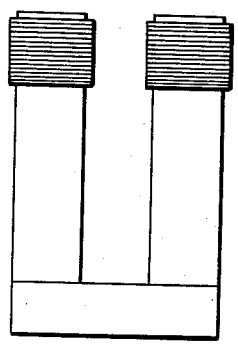
Fig. 3 is a semi-diagrammatic illustration of a magnet formed of chrome steel.
Figure 4:
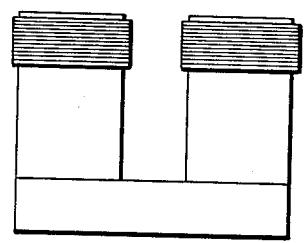
Fig. 4 is a similar illustration of a magnet having the same output characteristics formed of cobalt steel.

Referring to Fig. 2 of the drawings, it will be seen that the flux in commercial 4% chrome magnet steel may run as high as 10,000 gauss, but that the coercive force only runs as high as around 70 gilberts, whereas cobalt magnet steel has a maximum flux of 9,000 gauss, but the coercive force may run as high as 250 gilberts. From this it will be seen that a magnet formed of chrome steel would have long thin bars as illustrated in Fig. 3 as compared with a magnet having the same output characteristics formed of cobalt steel as illustrated in Fig. 4.

Figure 5:
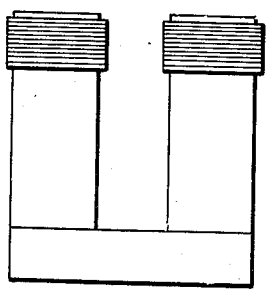
Fig. 5 is a similar representation of a composite magnet according to the present invention having the same output characteristics with dimensions intermediate those of the magnets represented in Figs. 3 and 4.

According to the present invention, a magnet having intermediate dimensions as illustrated in Fig. 5 may be constructed so as to have the same output characteristics by using alternate sections of different commercial magnet steels. Thus, in Fig. 5 there is illustrated a magnet in which one bar is formed of chrome magnet steel and the other of cobalt steel. The characteristics of a magnet so formed are graphically illustrated by the intermediate curve of Fig. 2. It has been found that such composite magnets successfully solve the difficulty of providing a flexibility in the design of magnetos having fixed output characteristics, or, on the other hand, enables the attainment of certain desired output characteristics without departing from the dimensions of standard rotors.

Thus, it has been found possible to construct a rotor as illustrated in Fig. 1 having alternate magnet bars of chrome and cobalt steels, in which the permeability of the chrome steel in conjunction with the high coercive force of the cobalt steel produces a rotor which is highly efficient as regards its output characteristics and is capable of incorporation in magnetos of standard construction in order to improve the operation thereof.

For instance, if it were desired to improve the operating characteristics of a magneto having a rotor embodying chrome magnet bars, it would be necessary to enlarge the diameter of the rotor in order to make room for the larger diameter bars of cobalt steel required to secure the desired flux. However, by simply substituting alternate bars of cobalt steel having the same cross-section as the replaced bars of chrome steel, it is possible to secure added coercive force from the cobalt steel magnets while retaining the high permeability of the chrome steel magnets alternating therewith. It is thus possible to secure a rotor with improved operating characteristics without redesigning the magneto or changing the dimensions of any of its parts.

Although the use of only two specific commercial magnet steels has been discussed, it will be understood that the principle of the present invention applies also to the use of other less common forms of magnet steels, and the invention is not limited to the use of any particular magnet steels except as defined in the claims appended hereto.

What is claimed is:

1. A magneto rotor comprising magnets formed of a plurality of magnet steels having differing characteristics.

2. A magneto rotor including a plurality of serially arranged sections of magnet steels having different characteristics.

3. A magneto rotor including magnets formed partly of steel having relatively high coercive force and low permeability, and partly of steel having relatively low coercive force and high permeability.

4. A magneto rotor including magnets formed partly of cobalt magnet steel and partly of chrome magnet steel.

5. A magneto rotor including magnets having alternate bars of cobalt magnet steel and chrome magnet steel.

TULLIO TOGNOLA.